US 9,846,853 B2

(12) United States Patent
Ertas

(10) Patent No.: US 9,846,853 B2
(45) Date of Patent: *Dec. 19, 2017

(54) SYSTEM AND METHOD FOR PROVIDING PRODUCTS FROM MULTIPLE WEBSITES

(71) Applicant: FUJIFILM North America Corporation, Valhalla, NY (US)

(72) Inventor: Ali Seymen Ertas, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/827,844

(22) Filed: Aug. 17, 2015

(65) Prior Publication Data

US 2015/0356499 A1 Dec. 10, 2015

Related U.S. Application Data

(63) Continuation of application No. 13/346,977, filed on Jan. 10, 2012, now Pat. No. 9,111,306.

(60) Provisional application No. 61/431,083, filed on Jan. 10, 2011.

(51) Int. Cl.
| | |
|---|---|
| *G06Q 30/00* | (2012.01) |
| *G06Q 10/08* | (2012.01) |
| *G06Q 30/02* | (2012.01) |
| *G06Q 20/14* | (2012.01) |
| *G06Q 30/06* | (2012.01) |

(52) U.S. Cl.
CPC ........... *G06Q 10/087* (2013.01); *G06Q 20/14* (2013.01); *G06Q 30/0241* (2013.01); *G06Q 30/0277* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 7,216,092 | B1 | 5/2007 | Weber et al. |
| 2007/0220413 | A1 | 9/2007 | Beaver, III |
| 2008/0091610 | A1 | 4/2008 | Benjamin |
| 2008/0162271 | A1 | 7/2008 | Benjamin |
| 2008/0300980 | A1 | 12/2008 | Benjamin et al. |

(Continued)

FOREIGN PATENT DOCUMENTS

| | | |
|---|---|---|
| WO | 2007092358 A2 | 8/2007 |
| WO | 2009055738 A1 | 4/2009 |

*Primary Examiner* — Courtney L Stopp
(74) *Attorney, Agent, or Firm* — Woods Oviatt Gilman LLP; Dennis B. Danella, Esq.

(57) ABSTRACT

A system and method that combines content with one or more canvas products to provide finished products for dissemination to end customers is provided. More specifically, a system and method are provided to enable a content provider to select one or more canvas products to which content would be applied, whereby the content provider may then provide web links on any of a multitude of locations to redirect an end customer to a canvas product center and/or fulfillment center to acquire finished products having content thereon. The finished product is customizable for and by any one or more content providers for a unique appearance and offering to end customers. Content providers are able to leverage the infrastructure, network and benefits of a third party while enjoying the ease of setup, minimal up-front costs and eliminate the need to invest in or carry an inventory of finished products.

19 Claims, 5 Drawing Sheets

(56) References Cited

U.S. PATENT DOCUMENTS

2009/0109214 A1 4/2009 Harvill et al.
2009/0177545 A1 7/2009 Castineiras

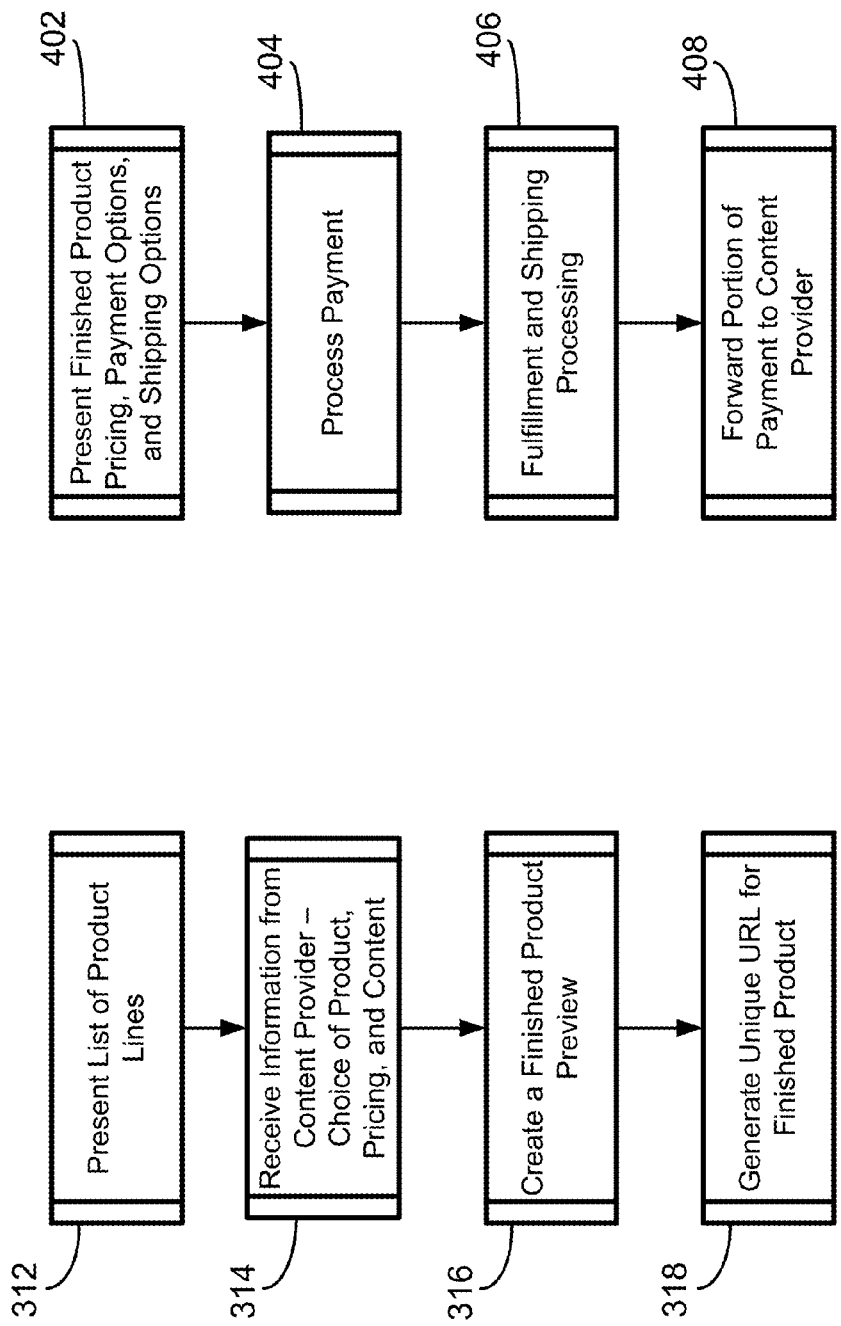

SYSTEM AND METHOD FOR PROVIDING PRODUCTS FROM MULTIPLE WEBSITES

CROSS-REFERENCE TO RELATED APPLICATIONS

This application is a continuation of U.S. patent application Ser. No. 13/346,977, filed Jan. 10, 2012, now U.S. Pat. No. 9,111,306, which claims the benefit of U.S. Patent Application No. 61/431,083, filed Jan. 10, 2011, which are hereby incorporated by reference in their entirety.

FIELD OF THE INVENTION

The present invention is directed to a system and method that combines artwork content with one or more products having a content receiving region (i.e., a canvas product) to provide finished products that may be advertised and purchased from any website and then disseminated to end customers. A system and method are provided for identifying at least one canvas product from a first entity to which content from a second entity may be applied, to provide finished products. The finished products may be ordered by customers and fulfilled by the first entity or a third entity. The finished product is customizable for and by any one or more content providers for a unique appearance and offering to end customers. The finished products are offered by a content provider via links that may be placed on any one or more websites, social network pages or other medium that are independent of a fulfillment center, canvas product center or the content provider. The links connect end customers to the canvas product center and/or fulfillment center where orders may be placed, payment made and products shipped, all without any interaction by the content provider. Content providers are able to leverage the infrastructure, network and benefits of a third party fulfillment center while enjoying the ease of setup, minimal up-front costs and eliminating the need to invest in or carry an inventory of finished products while receiving payments for fulfilled finished products.

BACKGROUND OF THE INVENTION

The ability and need to distinguish and expand products and service offerings continue to be a driving force of today's economy. Solutions to provide add-ons, additional revenue streams, marketing, and inventory management are a constant challenge to various companies. Businesses continue to look for ways to improve their margins through minimized costs without adversely affecting their sales or product offerings. Intrinsic to these environments is how to better utilize existing mediums or products and leverage technologies or other services to facilitate such solutions. For example, a photographer, company or individual that may be responsible for developing or creating content or other artwork may need to expand revenue by looking beyond just selling photographs of the artwork. Such an entity might look to offer such content or artwork on some specific product lines such as books, brochures, key chains, mugs, t-shirts, calendars and the like.

In these instances, the content owner may be limited in a number of ways. In the first place, the content owner would have to set up or at least engage in a new business venture that will handle ordering the products on which the artwork would be displayed, imprinting or otherwise incorporating the artwork on the products, maintaining an inventory of finished and unfinished products, processing sales orders, and distributing the finished products to end customers.

Currently, such distribution of products is accomplished using the Internet. In the described scenario, the content provider would need a website that is set up for order taking and processing, as well as a back office system or model for providing shipping and/or product delivery. Such an endeavor can be both costly and time consuming for the content provider, thereby diminishing the likelihood of engaging in such an endeavor. More importantly, such an endeavor may distract the content provider from its core business or interests.

To address this need and overcome some of the shortcomings described earlier, some systems have been implemented in the marketplace to allow a content provider to partner with a product company. One such system is provided by Zazzle.com Inc. of Redwood City, Calif. (www.zazzle.com). In such an arrangement, the content provider provides the product company with artwork content to enable customers to order content emblazoned products. However, such an arrangement limits the exposure for the content provider because the artwork content is only being displayed and marketed through a single product outlet. The content provider is limited to the single site of the product company or those of the product company affiliates.

Another system may allow the content provider to provide a link on a product company's website to enable customers to order content emblazoned products. However, such a system may be limited in the sense that the product company may not have the capability or desire to be engaged in the processing of payments or fulfillment of orders on a retail basis on behalf of the content provider. The foregoing problem may be addressed by allowing a third party processor company to process or fulfill orders for finished products, when a link is provided on that third party processor's website. The problem with this option is that the content provider is still limited to a single outlet for his finished products. In other words, these solutions still present some major disadvantages and suffer from a number of limitations. Importantly, the content provider is limited in the placement of its links to just the website of the product company and/or website of the third party processor, which results in limited exposure for the content provider. Furthermore, content providers may be faced with the requirement of meeting certain minimum order quantities from the product manufacturer, or worse yet, be required to maintain a product inventory. Even further, the use of a third party for processing/fulfilling orders creates another middle man that has to be compensated and is potentially a bottle neck in product flow, or is at least another entity with whom the content provider must interact.

There exists a need to eliminate the requirement that the content provider maintain an inventory. Even further, there exists a need to provide the content provider with a solution that will facilitate the broadest possible exposure for the finished product through placement of links on a plurality of disparate or similar websites. Further still, there exists a need to minimize the bookkeeping and order tracking that would be involved for the content provider.

What is needed in one aspect is an enhanced product linking capability that will enable a content provider to offer products that incorporate its content on any chosen website. In another aspect, a system and method that provides orderings and fulfillment for multiple products to a multitude of sites is needed. There is currently no efficient technique for individualized content provider products to be advertised and purchased from a multitude of websites, social networks or other similar forums.

Accordingly, there is a need for an efficient, scalable, user friendly and robust technique to provide product links that can be placed on multiple sites, wherein the product links direct a customer to a canvas product center/fulfillment center to obtain customized products that may have a variety of content from content providers. The present invention fills these needs as well as other needs.

SUMMARY OF THE INVENTION

The present invention is directed to a system and method that combines artwork content with one or more canvas products to provide finished products that may be disseminated to end customers. The present invention provides a product link to a third party fulfillment provider that can be utilized by an end customer to order a finished product having incorporated therein, images or other content provided by a content provider. The invention provides at least one canvas product as a medium for images or other content from the content provider. The images or content may then be incorporated into the canvas product to produce a finished product, a preview of which is provided as a product Universal Resource Locator (URL) link, which may be located on any webpage or forum page. Customers are able to place orders for the finished product by selecting the link. Selection of the link navigates the customer to the third party fulfillment provider site where payment is processed, the customer order is processed and shipped, and the content provider is compensated.

For instance, one aspect of the invention is directed to a method for providing a finished product from a fulfillment provider to an end customer, the finished product having incorporated therein, an image or other content provided by a content provider. The method comprises: providing to the content provider at least one canvas product for selection by the content provider, the canvas product providing a medium for presenting the images or content; receiving specifications for the placement of the image or content from the content provider; providing an advertisement image of the finished product as a product Universal Resource Locator (URL) link, wherein the product URL link may be located by the content provider on a web page or other similar display forum for selection by the end customer to generate a request for the finished product; navigating the end customer upon selection of said URL to a web site of the fulfillment provider, wherein payment is received by the fulfillment provider to fulfill the request for the finished product; and incorporating the image or other content with the canvas product to provide the finished product to the end customer.

Another aspect of the invention is directed to a method for providing a content provider with fulfillment to end customers of a printed product that incorporates the content provider's artwork or image, wherein the end customers may order the printed product from a plurality of unrelated websites that are independent of a third party fulfillment provider. The method comprises: providing at least one product onto which the content provider's artwork or image will be placed to result in the printed product; receiving the artwork or image for transfer onto the at least one product; and providing a preview of the printed product as a product URL link. The product URL link may be placed on any one or more of the plurality of unrelated websites for selection by an end customer. The selection of the URL link by the end customer directs the end customer to a webpage of the third party fulfillment provider, wherein an order and payment for the printed product is completed.

In yet another aspect of the invention, a method for enabling a content provider to offer finished products from any website of choice is provided. The method comprises: placing an order with a fulfillment provider and identifying at least one canvas product; providing content to the fulfillment provider to be incorporated on the at least one canvas product to provide a finished product; and receiving from the fulfillment provider a product URL link for placement on any website of choice. The end customers may employ the product URL link to access the fulfillment provider to purchase the finished product, wherein the product URL link provides identification of the finished product.

In a further aspect of the invention, a method for enabling the offering of a product URL link to a group of customers is provided. The method comprises: providing a product URL link for a group of potential customers whereby each one can indicate an interest or initiate a purchase in one or more finished products; aggregating the interest or purchase; and initiating a fulfillment order.

In another aspect of the invention, a method for limiting access to a product URL link is provided. The method comprises: providing a criteria option to a content provider, the fulfillment of which would effectively disable the product URL link and prevent further orders of one or more products. The content provider may limit the quantity of items that are sold or specify a time limited offer in an automated manner and without having to personally monitor quantities or track an offer period.

In yet another aspect, a method for providing a prepaid product URL link from a first customer to one or more other customer is provided. The method comprises: providing an option to a first customer when making a purchase to have an order fulfilled or provide a product URL link for use by a second customer, wherein the second customer utilizing said product URL link may place the order and have the order fulfilled without a need for the second customer to make payment. The first customer is essentially able to make a gift of one or more finished products via the system of the present invention, while still allowing the second customer to make appropriate selections and specify fulfillment criteria for the one or more finished products.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein:

FIG. 3B is a flow chart generally illustrating a procedure for enabling a canvas product center to identify products and content for specifying a product link;

FIG. 4 is a flow chart generally illustrating steps that may be performed by a fulfillment provider to process a customer order according to the present invention.

DETAILED DESCRIPTION OF THE INVENTION

Figure 1:
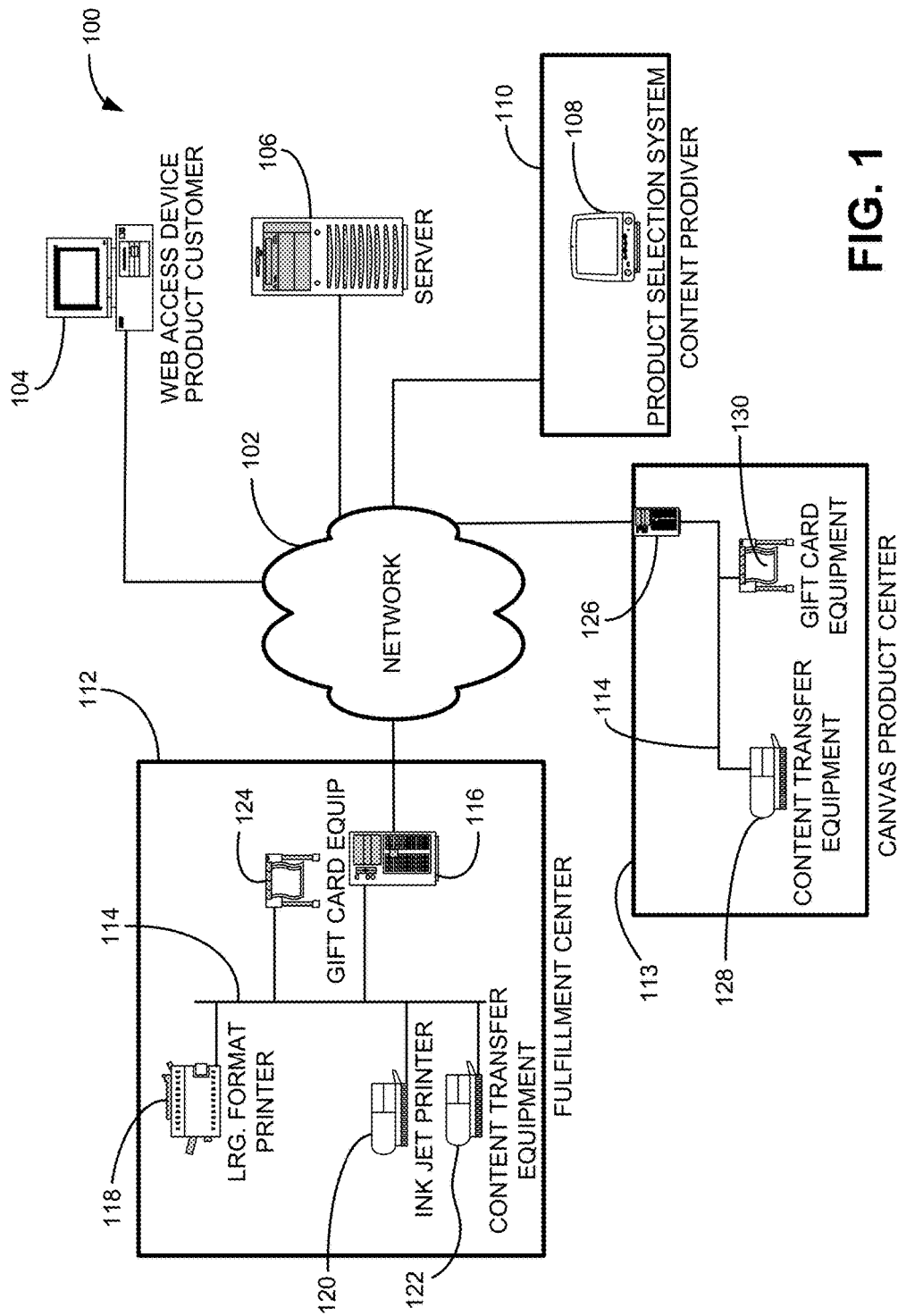
FIG. 1 generally illustrates a networking environment in which the present invention may be implemented.

Generally, the tools and methods described herein for creating and implementing product linking for providing customized finished products that may be implemented, processed and fulfilled by parties other than the content provider may be implemented in hardware, software or a combination thereof.

This document is organized as follows: In the first section, an overview of the techniques and implementation is provided and described along with an exemplary network environment; In the next section, an exemplary finished product as produced by the present invention is discussed. Following this, the specifics of the work flow and implementation for the product link and ordering process is discussed, including the operational functions of the present invention. Finally, an exemplary computer environment for the implementation of the invention is described.

Overview of Techniques and Implementations

The present invention provides a system and method that combines content, such as works of art, images, photographs, text, music, video, or any digital content, with one or more products having a content receiving region (hereinafter "canvas product" or "canvas products") to provide finished products that may be purchased and disseminated to end customers via a product link. It should be understood that the canvas product may include, but is not limited to a photo print, mug, clothing, key chain, memorabilia, brochure, calendar, catalog, book, blanket, and owner's manual.

In particular, a system and method are provided for identifying at least one canvas product from a product provider. Content from a content provider may be applied to the canvas product (or canvas product line), resulting in a finished product (or finished product line) that is associated and identified by a unique product Universal Resource Locator (URL) link. The product URL link may be advertised or located on any one or more website pages, or other forums, to enable regional, domestic and international retail or wholesale merchandising of the finished product. An interested customer may then order finished products by utilizing the product URL link. The product URL link connects the customer with a fulfillment processor/provider. The fulfillment provider processes payment information and fulfills the order. In other words, content providers are able to provide, market and sell a variety of finished products with no need to stock products by using an easy setup system that has no upfront costs.

The present invention introduces a number of concepts and a unique paradigm for the marketing and sale of a product. Certain key terms need to be addressed and understood in order to appreciate the invention. The present invention is described with reference to equipment, roles and processes that relate to images and more specifically, the application of images to products. However, as would be appreciated by one skilled in the art, the invention may be applicable to other processes and implementations, the references and discussion provided herein are strictly for illustrative purposes and are not intended to limit the scope of the invention.

A canvas product center originates product lines and provides the integration or configuration of product lines and content that is supplied for application thereto. A canvas product is a product or product line having a content receiving region that provides an area for the incorporation of content therein. A product/product line may include such items as a photo print, mug, clothing, such as a T-shirt, key chain, memorabilia, brochure, calendar, catalog, book, blanket, owner's manual or other medium that will present, display or otherwise communicate content. The integration of a product line with content results in finished products. Finished products as used herein, comprises a selected canvas product line that has been combined with content supplied by the content provider. The canvas product center may interact directly or indirectly with customers to take orders, wherein communication is initiated between the customer and fulfillment center via the product URL link.

A content provider, such as, for example, a photographer or artist, authors content including artwork, images, text, music, video, digital content, or other such expressions. The content provider selects a particular product line/canvas products and may identify content that should be displayed thereon. Along with the product configuration, a unique index or identifier for the requested product and content is provided to the content provider in the form of the product URL link.

A customer is the originator of an order for finished products. Using a web browser, the customer initiates a request for a finished product.

A fulfillment center or order processor can be defined as the entity that provides the end product to the customer by direct shipment to the customer, or by shipment to a store location so that the customer can pick-up the finished products.

Having described some base concepts of the invention, aspects of the invention will now be described with reference to the drawing figures. An exemplary environment or system in which the present invention would be applicable is shown in FIG. 1 and is designated as reference numeral 100.

The environment 100 may include a network 102, such as a Local Area Network (LAN), Wide Area Network (WAN), Internet, Wireless network or other similar configuration for allowing communication among two or more computing devices. Connected to network 102 may be one or more general purpose computing devices 104, 110. Computing devices 104,110 may include devices such as handheld devices, laptop computers or personal computers, which may be located in a home, office, retail location or other environment, and that provide an interface for user interaction with local or remote applications or systems. Computing devices 104, 110 may also be a wireless device such as a cellular phone or personal digital assistant.

A server 106 may also be connected to network 102 to provide any one or more of a variety of functions including serving as a web server, data store, and application server and/or provide other services. A product selection device 108, which may be associated with computing device 110, may also be connected to network 102.

A fulfillment center 112 may also be remotely located and connected to network 102. The fulfillment center 112 may have its own local area network 114 and a local server 116 in addition to other devices for fulfilling customer orders. The server 116 may provide local services in addition to providing communication and data exchange with network server 106. A canvas product center 113 having a server 126 may also be connected to the network 102. The canvas product center 113 may include equipment for producing finished products in addition to the order taking system for servicing the content provider and the system for communicating with customers via the product URL link. In addition to typical devices found in an office environment, fulfillment center 112 or canvas product center 113 may include a large photo format printer 118, ink jet printers 120, gift card equipment 124, 130, content transfer equipment 122, 128 or other devices for transferring or incorporating digital images onto a variety of mediums by, for example, printing, etching, embroidering, and embroidering.

Generally, the present invention relates to providing the unique product URL link to a content provider user of the computing devices 110. The product URL link enables the content provider user to attach a unique and distinctive look or feature, branding information, coupons, special messages, marketing content or finished product preview onto any website of choice, whereby a customer using computing device 104 may place an order for finished products. A content provider provides to the canvas product center 113 data files of content along with a specification of the location and size of such content, an identification of one or more canvas product lines onto which the content would be placed using product selection system 108, along with the unit price for each finished product. A customer utilizing the computing device 104 can place an order for a finished product. In an embodiment of the present invention, the order is placed by clicking on the product URL link, which established communication with canvas product center 113. The canvas product center 113, in conjunction with fulfillment center 112, processes and delivers finished products comprising the selected canvas product and provider specified content, in sizes and locations on the canvas product designated by the content provider. The content provider specification may be accomplished with an order manifest. The order manifest file in an embodiment of the present invention may be an eXtensible Markup Language (XML) file that contains all the information that will be utilized to render or otherwise produce the finished product and identify same.

In order to provide the finished product to the customer, one or more software programs, such as an ordering manifest system, allows a content provider to specify among other things for example, the size of an image to be applied to the canvas product, the number of images in the order, any logo, the content provider's contact information, banking or other payment specifics, any other relevant information along with information on where items should be located on the canvas product, and any business rules for the fulfillment center. The present invention provides means for content providers to provide this information and for canvas product center or fulfillment center to maintain and implement the information. More specifically, the present invention provides a methodology for a collaborative yet distinctive and individualized design and delivery of a finished product.

In one aspect, the present invention enables the offering of a product URL link to a group of customers, namely, a group product URL link. Similar to the product URL link that is created for use by an individual customer, a URL is created to enable a group of potential customers to individually and separately indicate an interest in or initiate a purchase for one or more finished products, including the ability to pay for such products but without the fulfillment aspect being implemented. In other words, in a situation where a single group order of multiple customer orders may be required, such as if a first customer is taking orders for new calendars from multiple other customers and the first customer wishes to place a single large order with the content provider or fulfillment center. The present invention aggregates the interest or purchases, including tallying up the total for the group order, and then enables the first customer to initiating a fulfillment order for the entire group.

In another aspect of the present invention, a method for limiting access to a product URL link is provided. It is desirable in some instances that a content provider provide some parameters or limitations on the orders that can be placed by customers. For example, an artist may want to limit the number of copies of a particular artwork that would be sold. Similarly, a content provider may want to only offer a particular finished product for a limited period of time. The present invention provides a criteria option to a content provider whereby the content provider can specify a type of limitation on the orders including, but not limited to, quantities or offer period. Utilizing the criteria option as a trigger, the present invention effectively disables the product URL link and prevents further orders of products. A content provider is thus able to control the product URL link in a detached an automated manner, and without having to personally monitor quantities, track an offer period or other limiting criteria.

In yet another aspect, the present invention provides a prepaid product URL link that can be sent from a first customer to one or more other customer such as in the case of a gift. An option is provided to a first customer when making a purchase, to have an order fulfilled or to have a product URL link created that can be communicated to and used by a second customer. The second customer is able to utilize the product URL link to place an order and have the order fulfilled without the need to make a payment. Utilizing this aspect of the invention, the first customer may make a gift of one or more finished products, while still allowing the second customer to make appropriate selections and specify fulfillment criteria for the one or more finished products.

Representative Implementation

Figure 2:
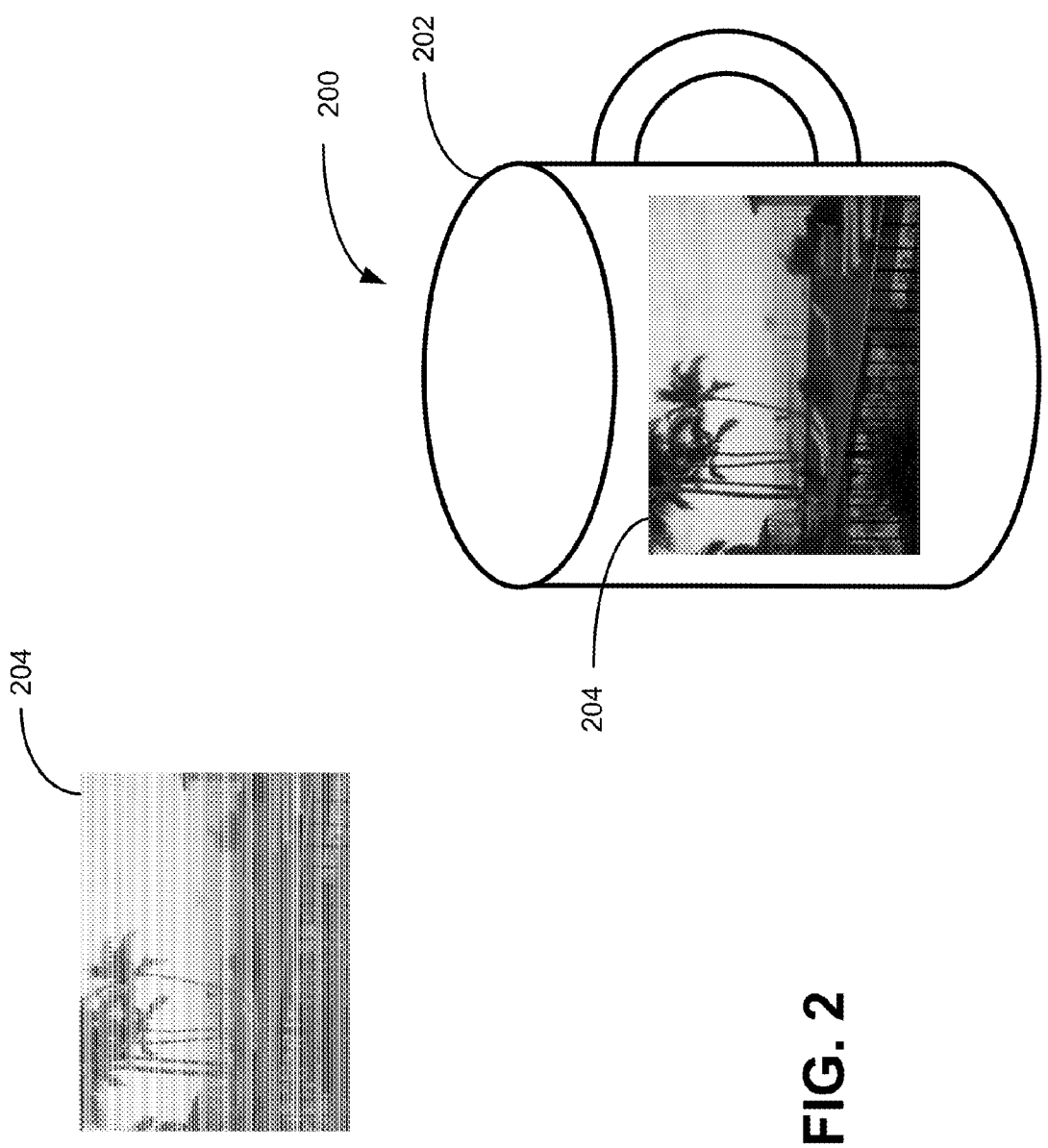
FIG. 2 is an illustration of an exemplary product, content and finished product according to the present invention.

The present invention and the advantages thereof can be further appreciated by considering a representative implementation. In the representative implementation, the creation of a finished product mug having tropical pictures emblazoned thereon is described in accordance with the present invention and with initial reference to FIG. 2. FIG. 2 provides an exemplary finished product 200. For the purpose of illustration, the finished product 200 described hereafter as a coffee mug, on which the photographic images specified by a content provider will be printed. As shown, the coffee mug 200 comprises an outer cylindrical surface region 202, onto which an image 204 is imprinted. Image 204 may be uniquely and independently sized to enable the surface region 202 to accommodate one or more varieties of images. Initially, a blank coffee mug (canvas) along with other products such as t-shirts, buttons, or posters may be presented by canvas product center 113 as choices to a content provider. The content provider working in conjunction with canvas product center 113 may then select the coffee mug 200 and provide specific order manifest information for any content that the content provider wishes to imprint on to the coffee mug 200. The content provider may also specify a price for the finished product coffee mug 200, which is the content provider's unique product.

As previously noted, the content provider is responsible for creating and providing all translated content and any static and/or dynamic items that will be placed on the product line. The example of the coffee mug 200 further illustrates this feature. In another example, a content provider such as an appliance manufacturer may provide a brochure or book such as an appliance owner's manual as the content. As in the case of the mug, a product URL link will be created and associated with the finished product (i.e., the owner's manual). In this case, the appliance manufacturer may provide the product URL link on its website or merely specify the product URL link in other documentation provided to the appliance purchaser. In either scenario, the product URL link directs the appliance owner to the website for canvas product center 113 where a copy of the owner's manual may be ordered and shipped to the appliance purchaser by fulfillment center 112. In another aspect of the present invention, fulfillment center 112 may track the number of copies shipped along with a running total of costs, such that the appliance manufacturer could be set up as a bulk paying client of fulfillment center 112 that may have prepaid for a fixed number of manuals, or as a client that receives increasing percentages of revenue from purchased manuals.

Having described the finished product, attention is next directed to a work flow that is implemented to arrive at the finished mug product 200. A discussion of the work flow will further highlight some of the other features of the invention.

Figure 3A:
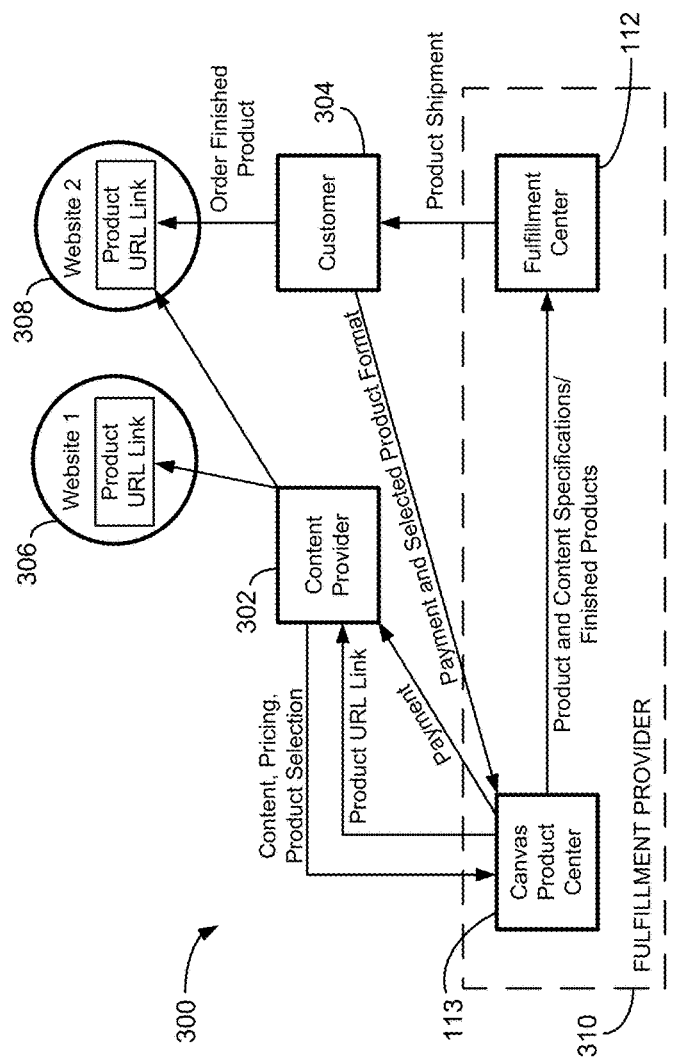
FIG. 3A is a representative block diagram of the components of an embodiment of the present invention.

The work flow is best described with reference to FIG. 3A. The system and method of the present invention is best conceptualized by considering a workflow 300 comprising four components 112, 113, 302, 304 and the interactions therebetween in conjunction with one or more websites 306, 308 accessible via network 102. It should be understood that websites 306, 308 are shown for illustrative purposes, and that the present invention may be used with one website or more than two websites. The first component is a content provider 302, the second is canvas product center 113, the third is fulfillment center 112, and the fourth is a customer 304. Any one of these components may be a combination of software and/or hardware and the functions performed within any one component are not strictly limited to such component or entity. To the contrary, functions may be dispersed among the components 112, 113, 302, 304 or consolidated therewithin. For example and as shown, canvas product center 113 and fulfillment center 112 may be a combined entity known as a fulfillment provider 310.

In an embodiment of the present invention, content provider 302 initiates the workflow process by making contact with canvas product center 113 to submit an order for combining the content with a product line offered by the canvas product center 113. The canvas product center 113 presents a list of product lines, at step 312 as shown in FIG. 3B. The product lines may be manufactured by the canvas product center 113 or merely distributed or resold by the canvas product center 113. The canvas product center 113 receives an order manifest including a product choice, a pricing structure and content from content provider 302, at step 314. The canvas product center 113 performs any required validation of provided parameters and the content provider's order. At step 316, images specified within the order manifest, in this case the product URL link for the images or content, that will be placed on the finished coffee mug product 200 are acquired. The images may be located on the canvas provider's server system or any other source. Following this, also at step 316, the content provider's order is processed and a preview of the finished product is generated. Product and content specifications or other finished product data may be provided to fulfillment center 112, as necessary. In conjunction with the generation of the finished product preview, the product URL link is formulated and related to the finished product of the order, at step 318. A record for the fulfillment process or fulfillment provider may then be created to allow future reference and identification of the particular finished product when a fulfillment web server is accessed utilizing the product URL link.

The product URL link is returned or otherwise made known to the content provider 302 at the time of the order placement. The product URL link may then be located or placed on one or more websites 306, 308, including, but not limited to, social network pages or other forums where content provider 302 wishes to advertise or otherwise solicit finished product sales. In other words, content provider 302 is not limited in any way as to the number and type of sites or pages where he/she place the product URL link. Any potential customer that has an interest in the advertised product may then select the product URL link to place an order for a finished product.

Selection of the product URL link causes a customer's screen or browser to be redirected to the web server of canvas product center 113. The canvas product center 113 and/or fulfillment center 112 is then able to retrieve the finished product information.

Exemplary steps for the purchase of the finished product are best described with reference to FIG. 4. As shown in FIG. 4, the customer 304 is presented with photographs or other displays of the finished product, at step 402, and is given the option to select formatting for the product, for examples, border placement, etc. In addition, the customer is also presented with pricing information, payment options and shipping options. As previously described, the finished product specification may be in the form of a manifest order which may then be parsed and interpreted to fulfill the order. Based on the selection of the customer 304, the quantities ordered, and other fulfillment information supplied, payment is then processed at step 404 along with the selected product formatting. The finished product is then shipped to either customer 304 or a location specified by the customer 304, at step 406. In one embodiment of the present invention, the completion of the fulfillment also triggers a payment to content provider 302, of a predetermined portion of the payment received from customer 304. Alternatively, payment to content provider 302, may also occur immediately following the receipt of payment by canvas product center 113 rather than being delayed until the order is fulfilled.

The system and method of the present invention, preferably provides a convention/set of rules for the structure, content and use of tags in an order manifest XML file, thereby providing an interrelationship among the several data items contained therein, such as the selected product line, the content, placement of the content on the product, sales margins, or pricing for the finished product. These and other provisions enable the design and implementation of an easily maintained system for the content provider. Even further, these provisions make the system flexible, scalable, and robust, while minimizing content provider effort and startup costs.

Having described the system and method of the present invention and an embodiment thereof, an exemplary computer environment for implementing the described design and execution is presented next.

Figure 5:
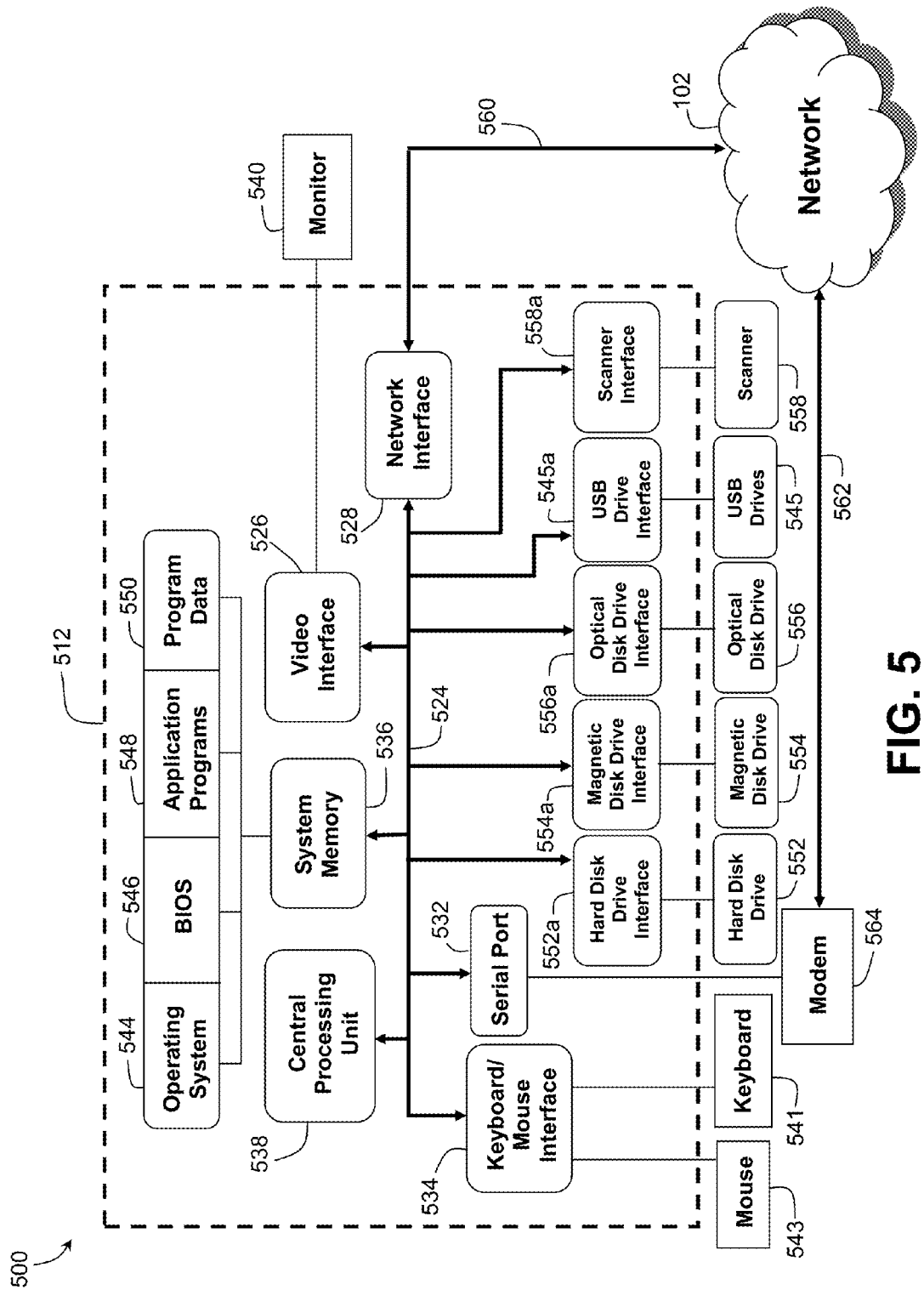
FIG. 5 is a block diagram generally illustrating a computing environment in which the invention may be implemented.

FIG. 5 shows an exemplary computing environment 500 that can be used to implement any of the processing thus far described. Computing environment 500 may include one or more computers 512 (such as, for example, computing devices 104, 110) comprising a system bus 524 that couples a video interface 526, network interface 528, a keyboard/mouse interface 534, and a system memory 536 to a Central Processing Unit (CPU) 538. A monitor or display 540 is connected to bus 524 by video interface 526 and provides the user with a graphical user interface to view, edit, and prepare an order, such as, for example, using digitally represented still images. The graphical user interface allows the user to enter commands and information into computer 512 using a keyboard 541 and a user interface selection device 543, such as a mouse or other pointing device. Keyboard 541 and user interface selection device are connected to bus 524 through keyboard/mouse interface 534. The display 540 and user interface selection device 543 are used in combination to form the graphical user interface which allows the user to implement at least a portion of the present invention. Other peripheral devices may be connected to the remote computer through universal serial bus (USB) drives 545 to transfer information to and from computer 512. For example, cameras and camcorders may be connected to computer 512 through serial port 532 or USB drives 545 so that data representative of a digitally represented still image, text, music, video, or other digital content may be downloaded to system memory 536 or another memory storage device associated with computer 512 such that the images may be subsequently printed by one or more canvas product center 113 and/or fulfillment centers 112 in accordance with the present invention.

The system memory 536 is also connected to bus 524 and may include read only memory (ROM), random access memory (RAM), an operating system 544, a basic input/output system (BIOS) 546, application programs 548 and program data 550. The computer 512 may further include a hard disk drive 552 for reading from and writing to a hard disk, a magnetic disk drive 554 for reading from and writing to a removable magnetic disk (e.g., floppy disk), and an optical disk drive 556 for reading from and writing to a removable optical disk (e.g., CD ROM or other optical media). The computer 512 may also include USB drives 545 and other types of drives for reading from and writing to flash memory devices (e.g., compact flash, memory stick/PRO and DUO, SD card, multimedia card, smart media xD card), and a scanner 558 for scanning items such as still image photographs to be downloaded to computer 512. A hard disk drive interface 552a, magnetic disk drive interface 554a, an optical drive interface 556a, a USB drive interface 545a, and a scanner interface 558a operate to connect bus 524 to hard disk drive 552, magnetic disk drive 554, optical disk drive 556, USB drive 545 and scanner 558, respectively. Each of these drive components and their associated computer-readable media may provide remote computer 512 with non-volatile storage of computer-readable instruction, program modules, data structures, application programs, an operating system, and other data for computer 512. In addition, it will be understood that computer 512 may also utilize other types of computer-readable media in addition to those types set forth herein, such as digital video disks, random access memory, read only memory, other types of flash memory cards, magnetic cassettes, and the like.

Computer 512 may operate in a networked environment using logical connections with fulfillment center 112 and/or canvas product center 113. Network interface 528 provides a communication path 560 between bus 524 and network 102, which allows, for example, an order from a customer to be communicated through network 102 to fulfillment centers 112, or for a product selection to be communicated to canvas product center 113 from content provider 302. The order or product selection, for example, may also be communicated from bus 524 through a communication path 562 to network 102 using serial port 532 and a modem 564. Using a modem connection between the computer 512 and canvas product center 113 and/or fulfillment center 112 is commonly used in conjunction with a wide area network (WAN). It will be appreciated that the network connections shown herein are merely exemplary, and it is within the scope of the present invention to use other types of network connections between remote computer 512, canvas product center 113, and fulfillment centers 112 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A computer-implemented method for providing a finished product from a fulfillment provider to an end customer, the finished product having incorporated therein, content identified and provided by a content provider, said fulfillment provider including a processor programmed for executing the method comprising:
    providing to said content provider a list including at least one canvas product for selection by said content provider, said canvas product providing a medium for presenting said content;
    receiving from said content provider an order manifest file including a location of said content identified by said content provider and an identification of said selected canvas product;
    obtaining said identified content;
    providing to said content provider a product Universal Resource Locator (URL) link, wherein said product URL link is configured for being located by said content provider on a third party website for selection by said end customer to generate a request for the finished product;
    navigating said end customer upon selection of said product URL to a website of said fulfillment provider, wherein payment is received by said fulfillment provider to fulfill said request for said finished product; and
    incorporating said content with said canvas product to provide the finished product to said end customer, wherein said third party website and said website of said fulfillment provider are separate websites, and wherein said third party website is not controlled by said fulfillment provider.

2. A method in accordance with claim 1, wherein said other content includes at least one of an image, a work of art, text, music, video, and digital content.

3. A method in accordance with claim 1, wherein said at least one canvas product includes at least one of a photo print, mug, clothing, key chain, memorabilia, brochure, calendar, catalog, book, blanket, and owner's manual.

4. A method in accordance with claim 1, wherein other informational items are received by the fulfillment provider so that said request for the finished product may be fulfilled, wherein said other informational items includes a product format selected by said end customer.

5. A method in accordance with claim 1, wherein said third party web page, said end customer, and said fulfillment provider are connected to a network.

6. A method in accordance with claim 1, wherein said product URL link is a group product URL link that is available to multiple customers, said multiple customers defining a group, wherein at least one of said multiple customers of said group initiate a request for the finished product from the fulfillment provider; and
wherein said request that is provided to the fulfillment provider is collated and tallied for said group in accordance with a grouping criteria, said grouping criteria further enabling a single fulfillment of all of the orders from said multiple customers.

7. A method in accordance with claim 1 further comprising the step of associating a link disabling criteria with said product URL link, wherein said link disabling criteria is provided by said content provider to disable said product URL link upon the occurrence of said link disabling criteria.

8. A method in accordance with claim 7, wherein said link disabling criteria is a predetermined number of total orders for the finished product.

9. A method in accordance with claim 7, wherein said link disabling criteria is a predetermined time period during which the finished product may be ordered by said end customer.

10. A method in accordance with claim 1, further comprising sending a notification to a second customer including said product URL link, wherein said second customer can request the fulfillment of the finished product that was paid for by said end customer.

11. A computer-implemented method for providing a content provider with fulfillment to an end customer of a printed product that incorporates content from the content provider, a fulfillment provider including a processor programmed for executing the method comprising:
providing at least one product onto which said content providers content will be placed to result in said printed product;
receiving said content provider's content for transfer onto said at least one product; and
providing a product URL link for selection by said end customer, wherein said selection of said product URL link by said end customer directs said end customer to a website of said fulfillment provider, wherein an order and payment for said printed product is completed; and
wherein providing said product URL link for selection by said end consumer includes placing said URL link on one or more third party websites, wherein said one or more third party websites and said website of the fulfillment provider are separate websites, and wherein said one or more third party websites are not controlled by said fulfillment provider.

12. A method in accordance with claim 11, wherein said at least one product includes at least one of photo print, mug, clothing, key chain, memorabilia, brochure, calendar, catalog, book, blanket, and owner's manual.

13. A method in accordance with claim 11, further comprising receiving specifications for said placement of said content provider's content from said content provider.

14. A method in accordance with claim 11, wherein said order received by said fulfillment provider includes a product format selected by said end customer.

15. A method in accordance with claim 11, wherein said end customers and said fulfillment provider are connected to a network.

16. A computer-implemented method for enabling a content provider to offer finished products from a third party website, the content provider including a processor programmed for executing the method comprising:
receiving from a fulfillment provider a list including at least one canvas product for selection by said content provider, said canvas product providing a medium for presenting content identified by said content provider;
selecting one of said at least one canvas product from said list;
providing to said fulfillment provider an order manifest file including a location of said content identified by said content provider and an identification of said selected one of said at least one canvas product;
providing said content to said fulfillment provider to be incorporated on said selected one of said at least one canvas product to provide a finished product; and
receiving from said fulfillment provider a product URL link for placement on a third party website, wherein end customers use said product URL link to access a website of said fulfillment provider to purchase said finished product, wherein said product URL link provides identification of said finished product, wherein said third party website and said website of said fulfillment provider are separate websites, and wherein said third party website is not controlled by said fulfillment provider.

17. A method in accordance with claim 16, wherein said content includes at least one of an image, a work of art, text, music, video, and digital content.

18. A method in accordance with claim 16, wherein said at least one canvas product includes at least one of a photo print, mug, clothing, key chain, memorabilia, brochure, calendar, catalog, book, blanket, and owner's manual.

19. A method in accordance with claim 16, wherein the content provider and said fulfillment provider are connected to a network.

* * * * *